March 29, 1966  C. W. HARSHBERGER  3,243,039
WOOD CHIP WASHER
Filed May 14, 1962  2 Sheets-Sheet 1
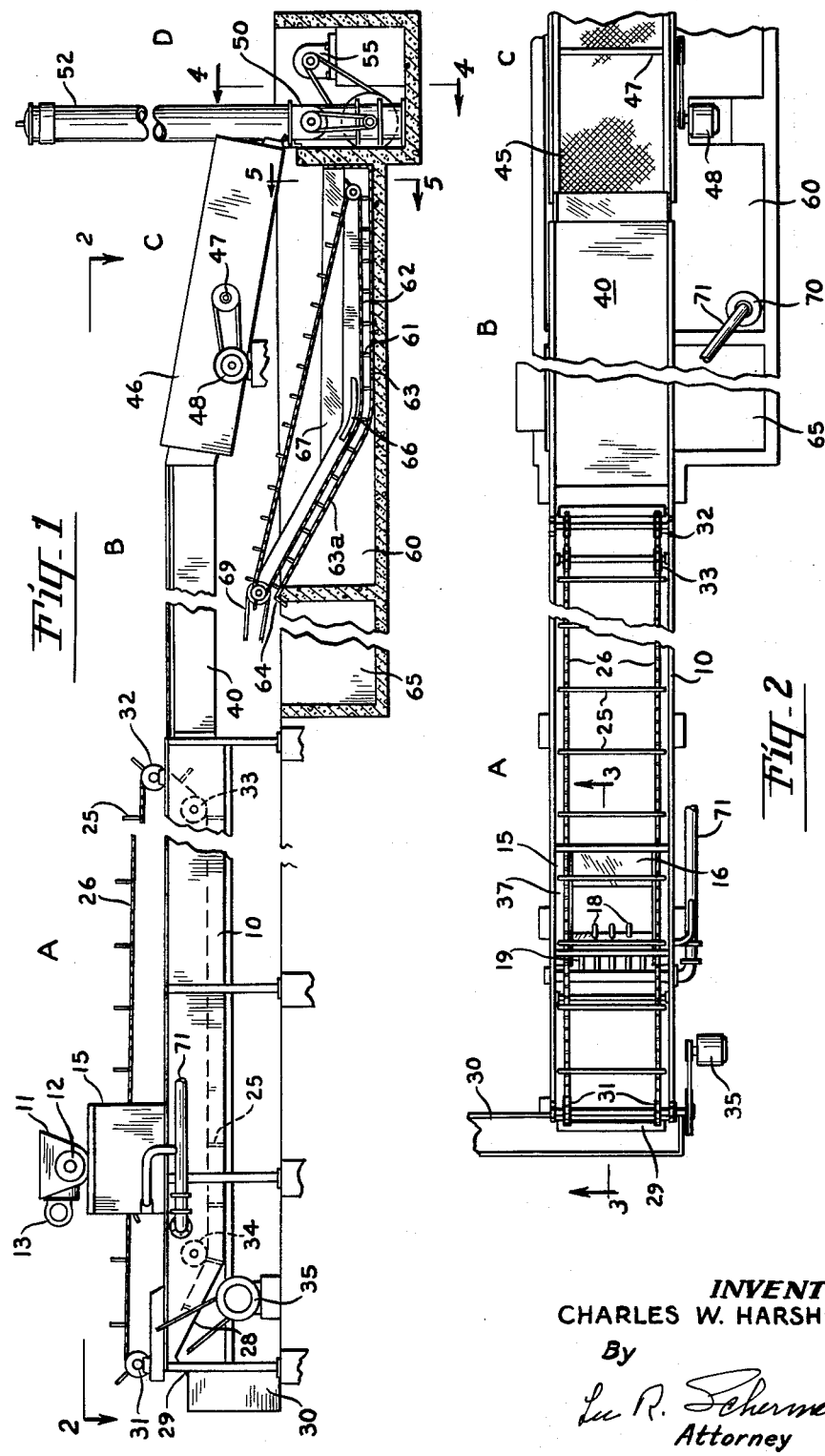
INVENTOR.
CHARLES W. HARSHBERGER
By
Lu R. Schermerhorn
Attorney March 29, 1966    C. W. HARSHBERGER    3,243,039
WOOD CHIP WASHER
Filed May 14, 1962    2 Sheets-Sheet 2
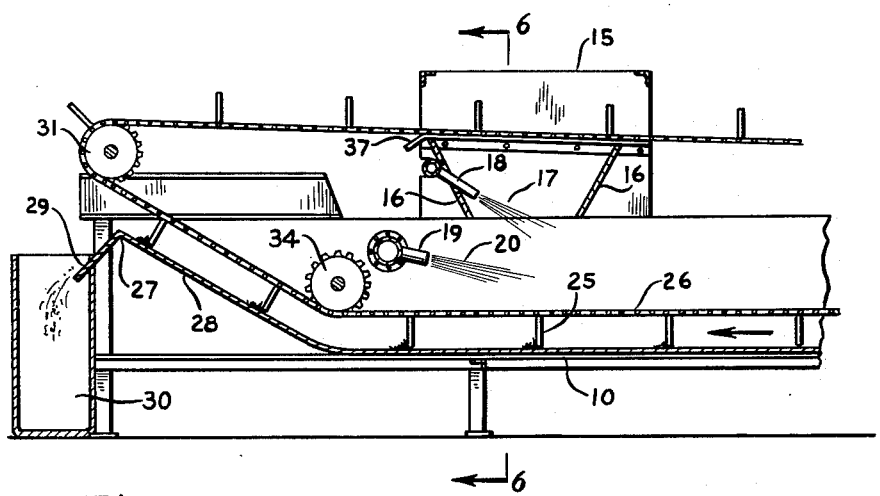
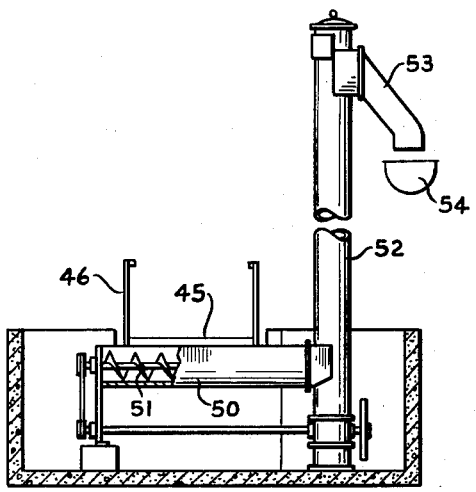
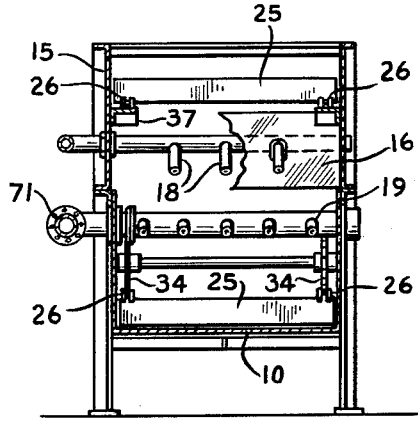
INVENTOR.
CHARLES W. HARSHBERGER
By
Lu R. Schermerhorn
Attorney United States Patent Office 3,243,039
Patented Mar. 29, 1966

3,243,039
WOOD CHIP WASHER
Charles W. Harshberger, Portland, Oreg., assignor to Harshberger Equipment Company, Portland, Oreg., a corporation of Oregon
Filed May 14, 1962, Ser. No. 194,560
4 Claims. (Cl. 209—3)

This invention relates to apparatus for washing wood chips for the purpose of removing foreign substances which would be injurious to the defibrating machines used in the pulp and paper industry and in the manufacture of various other products from wood fiber.

Wood chips are generally assumed to be clean because they look clean and because they are derived mainly from interior portions of wood that have presumably not had any opportunity to pick up dirt and other foreign materials. It is found, however, in the operation of defibrating machines that excessive wear and often breakdowns occur because of the presence of foreign materials in apparently clean chips. Since defibrating machines are costly equipment in themselves and because any breakdown in a production plant is inherently costly, it has become recognized as desirable to remove all foreign material from wood chips before defibration.

The general object of the invention is, therefore, to provide apparatus for removing tramp iron, rocks, sand and dirt from wood chips. Another object is to provide equipment for this purpose which is of relatively simple mechanical construction, rugged and reliable in operation and economical to operate and maintain.

The present chip washer performs its function in four stages. In the first stage the chips, while falling into a trough-like tank, are subjected to high pressure jets of water which separate them from each other and free the tramp iron, rocks, gravel and coarse sand. In the second stage the chips flow along the trough in a current of water over a series of baffles which create turbulence. The baffles are attached to chains as conveyor flights and are arranged to scrape the bottom of the trough to clean out the sedimentary or non-floating materials removed in the first two stages of washing.

The third stage comprises a flume where the chips are carried a further distance in a current of water which performs another washing action. From the flume the chips and water are discharged onto an inclined vibrating screen which performs a fourth washing and cleaning action by agitation while the water and any remaining fine sand and dirt pass through the screen. The washing tank or trough collects all the coarse material and some of the fine sand and dirt by float and sink separation while the flume and the vibrating screen remove the rest of the fine material, finally leaving the chips dewatered and free of any foreign material which might cause damage or excessive wear in defibrating machines.

The invention will be better understood and additional objects and advantages will become apparent from the following detailed description of a preferred embodiment of chip washer illustrated in the accompanying drawings. Various changes may be made, however, in the details of construction and arrangement of parts, and all such modifications within the scope of the appended claims are included in the invention.

In the drawings:

FIGURE 1 is a longitudinal sectional view of a chip washer embodying the features of the invention with sections of the machine removed for convenience of illustration;

FIGURE 2 is a top plan view of a portion of the machine taken on the line 2—2 of FIGURE 1;

FIGURE 3 is an enlarged fragmentary longitudinal sectional view taken on the line 3—3 of FIGURE 2;

FIGURE 4 is a cross sectional view taken on the line 4—4 of FIGURE 1;

FIGURE 5 is a cross sectional view taken on the line 5—5 of FIGURE 1; and

FIGURE 6 is a cross sectional view taken on the line 6—6 of FIGURE 3.

In FIGURE 1, A designates the first two washing stages involving water jets and turbulent flow through an elongated tank. The third washing stage B involves flow in a stream of water through a flume. In the fourth stage C the chips are dewatered and agitated on an inclined vibrating screen. Section D of the apparatus comprises horizontal and vertical conveyor mechanisms which partially air dry the chips and make them available for transportation to storage facilities or defibrating equipment.

The apparatus in section A is associated with an elongated trough-like tank 10. A chip feeder 11 is mounted above the tank near its left end as viewed in FIGURE 1. This feeder may, for example, be incorporated in the bottom of a large hopper or storage bin, not shown. The feeder contains a rotary dispensing device 12 driven by a motor 13. Directly under the feeder is a chip chute 15 having inclined deflector plates 16 forming a throat to channel the flow of chips into the tank 10 as shown in FIGURE 3. The falling chips are intercepted by high pressure jets 17 of water from nozzles 18 directed forwardly and inclined downward so as to break up lumps and separate the chips from each other and from tramp iron, rocks and gravel as they fall into the tank. Below the nozzles 18 is a second set of nozzles 19 which direct jets 20 forwardly and downwardly for a second impingement with the falling chips before they reach the surface of the water in the tank.

The bottom of the trough 10 is scraped in an upstream direction by a series of transverse baffle boards 25 mounted on a pair of endless chains 26. These baffle boards fit the bottom and side walls of the trough to scrape all sedimentary material washed out of the chips over a lip 27 on an inclined end wall 28 of the trough. These materials then slide down an apron 29 into a pit or suitable receptacle 30 for disposal.

As shown in FIGURES 1 and 2, the chains 26 are trained around driving sprockets 31 and idler sprockets 32, 33 and 34. The shaft of driving sprockets 31 is driven by motor 35 from time to time when it is desired to remove the sedimentary material from the bottom of the tank. The chains with their baffle boards 25 may be driven continuously at a slow rate if desired but it is usually preferred to let them remain stationary between cleaning intervals.

It will be observed that idler sprockets 33 and 34 hold the bottom reach of the chains parallel with the bottom of the tank so that the boards 25 scrape the bottom during the intervals of chain movement as above described. Driving sprockets 31 are so positioned that this scraping action continues up the inclined surface 28 after which the chains are elevated above the tank for their return flight between sprockets 31 and 32. This return flight of the chains and baffle boards passes through chip chute 15 with the chains supported on guides 37. The chips from feeder 11 fall freely through the openings between the chains 26 and between the boards 25.

Flume 40 in FIGURE 1 provides an outlet for the chips and water from trough 10. Both the trough and flume preferably have bottoms which are flat in both longitudinal and transverse directions with the bottom of the flume being at the approximate level of the upper edges of the baffle boards 25. Thus, the flume maintains the water level in trough 10 slightly above the baffle boards resulting in considerable turbulence as the floating chips must pass over the top edges of the baffle boards one after another on their way to the outlet flume 40. In other words, the baffle boards are submerged a distance equal to the depth of water in the flume. The baffle boards thereby form a series of submerged weirs in a flow of water supplied by the washing nozzles 18 and 19 and carrying a stream of floating chips supplied by the chip feeder 11. This turbulence produces a secondary washing action following the primary washing action of jets 17 and 20.

Flume 40, in addition to performing another stage in the washing action, also provides some flexibility in the layout of the plant when it is not possible or convenient to arrange the four apparatus sections A, B, C and D in a straight line as shown in the present drawings. For example, the flume 40 may form a horseshoe bend so as to place the sections C and D alongside the section A where such an arrangement better suits the available space. Such a horseshoe curve may bend either to the right or to the left and the bend may be less than 180° as best suits the available space.

The inclined screen 45 in section C is contained in a channel section 46 communicating with the outlet end of flume 40. The screen may be vibrated by any suitable means such as an eccentric or crank shaft 47 driven by a motor 48.

The dewatered chips are discharged from the lower end of screen 45 into a transverse trough 50 containing a screw conveyor 51 as shown in FIGURE 4. This screw conveyor feeds the chips into an elevating conveyor 52 having an upper discharge spout 53. Thus, the dewatered, cleaned and partially dried chips may be discharged onto a conveyor belt 54 or directly into a suitable receptacle or storage facility as desired. Flexibility is again provided in this chip handling arrangement whereby the vertical conveyor 52 may be located at the opposite end of trough 50, if desired, by reversing the screw 51. The transferring and overturning of the chips in this conveyor system exposes them to the air for a period of time sufficient to evaporate most or all of the free water on the surface of the chips. These conveyors may be driven by any suitable means such as motor 55 in FIGURE 1.

Underneath the vibrating screen 45 is a screen pit 60 to collect the water and sediment which passes through the screen. This pit contains a system of conveyor flights 61 on chains 62 to remove the sediment. This conveyor has a bottom flight trained along the bottom of a conveyor trough 63 which has an inclined portion 63a causing the sediment to be discharged over lip 64 into a collection tank or pit 65 for disposal. Trough 63 has flaring side walls 67 as shown in FIGURE 5 to catch the water and sediment passing through the screen 45. The water overflows from trough 63 into pit 60. The chains 62 pass under chain guides 66 to hold the flight boards 61 against the horizontal and inclined bottom surfaces of the trough. The chains may be driven by any suitable means such as belt 69 in FIGURE 1 to a motor, not shown.

In order to conserve water it is preferably circulated by a pump 70 having a screened inlet. This pump supplies a pipe 71 leading to the nozzles 18 and 19 which are the source of all the water flowing through trough 10 and flume 40. The rate of flow is sufficient to maintain a shallow depth of water in the flume.

The present washing system is adapted for continuous operation when desired, without shut down for cleaning. The counterflow movement of the conveyor flights 25 in trough 10 allows the removal of sediment from the inflow end of the trough while the washing action is in progress and chips are flowing out of the other end, the movement of these flights through the chip chute 15 offering no obstruction to the flow of chips. Likewise, the cleaning of pit 60 by conveyor flights 61 does not interrupt the chip washing operation and the water may be re-circulated continuously to supply the washing nozzles 18 and 19. When space does not permit a straight line operation, the apparatus may be disposed in a horseshoe, or L, or other angular configuration to fit the available space.

Having now described my invention and in what manner the same may be used, what I claim as new and desire to protect by Letters Patent is:

1. A chip washer comprising a trough having inlet and outlet ends, a chip chute above the inlet end of said trough, nozzles arranged to direct jets of water into chips falling through said chute to break up lumps and separate the chips from each other and from included debris as they fall into the trough, said nozzles furnishing a supply of water to float the chips toward the outlet end of the trough, a counterflow conveyor having transverse baffle boards engaging the sides and bottom of the trough and movable along the trough toward its inlet end, said baffle boards forming submerged weirs to create turbulence in the flow of water and chips for further washing of the chips, an inclined end wall in the inlet end of said trough disposed at an angle to the bottom wall of the trough upstream from said chip chute and having a lip above water level in the trough, said baffle boards engaging and travelling up said end wall to discharge non-floating debris over said lip, a flume carrying said flow of water and chips from the outlet end of said trough and subjecting the chips to further washing action, the bottom of said flume being connected with said trough approximately on the level of the top of said baffle boards which engage the bottom of the trough to maintain said water level in the trough slightly above said baffle boards, and a downwardly vibrating screen receiving said flow of water and chips from said flume, said flow of water passing through the upper end of the screen and the vibration of the screen advancing the chips down the screen and continuing to agitate water off the chips after the chips have advanced beyond said flow, and a pit under said screen arranged to catch the water flowing through the screen from said flume and the water agitated off the chips by the screen, said screen being disposed entirely above the water level in said pit.

2. A chip washer as defined in claim 1 including a series of conveyor elements receiving the de-watered chips from the lower end of said screen and arranged to transfer and overturn the chips in exposure to the air for a period of time sufficient to evaporate substantially all the free water from the surface of the chips.

3. A chip washer as defined in claim 1, said pit being separate from said trough, a conveyor arranged to clean sediment out of said pit, and a pump and piping arranged to supply said nozzles with water from said pit.

4. A chip washer comprising: a trough having inlet and outlet ends; a chip supply means adjacent the inlet end of the trough; nozzles directing jets of water against chips delivered by said supply means, said nozzles acting to break up lumps and to separate the chips from each other and from included sinkable debris substantially as the chips enter the trough, said nozzles supplying water to float the chips toward the outlet end of the trough; transverse baffle boards engaging the sides and bottom of the trough; means to move said baffle boards in such engagement along the trough towards its inlet end, said baffle boards forming submerged weirs; an end wall in the inlet end of said trough disposed at an angle to the bottom wall of the trough upstream from said chip supply means and having a lip above the level of water in the trough, said baffle boards engaging and traveling up said end wall to discharge sinkable debris over said lip; an inclined vibrating screen receiving floating chips from said trough, means connecting said trough and said screen, said means directing said chips and maintaining the level of water in said trough slightly above the upper edges of said transverse baffle boards; and a pit under said screen arranged to catch the water flowing through the screen from said trough and the water agitated off the chips by the screen, said screen being disposed entirely above the water level in said pit.

(References on following page)

References Cited by the Examiner

UNITED STATES PATENTS

| | | | |
|---|---|---|---|
| 616,831 | 12/1898 | Elliot | 210—526 X |
| 675,833 | 6/1901 | Jones | 209—11 X |
| 1,202,375 | 10/1916 | Fraser | 209—35 |
| 1,299,181 | 4/1919 | Harry | 209—458 |
| 1,445,917 | 2/1923 | Souder | 210—68 |
| 2,899,057 | 8/1959 | Menzies | 209—172.5 |
| 2,929,502 | 3/1960 | Harris | 209—173 |
| 3,017,661 | 1/1962 | Zartman | 209—12 |
| 3,042,198 | 7/1962 | Slavich | 209—44 |

FRANK W. LUTTER, *Primary Examiner.*

HARRY B. THORNTON, HERBERT L. MARTIN,
*Examiners.*